United States Patent
Lee

(12) 
(10) Patent No.: US 6,283,110 B1
(45) Date of Patent: Sep. 4, 2001

(54) CUTTING SAW MACHINE

(76) Inventor: Wy Peron Lee, 11614 Sterling Ave., Suite 103, Riverside, CA (US) 92503

( * ) Notice: Subject to any disclaimer, the term of this patent is extended or adjusted under 35 U.S.C. 154(b) by 0 days.

(21) Appl. No.: 09/228,837

(22) Filed: Jan. 12, 1999

(51) Int. Cl.[7] .................................................. B28D 1/04
(52) U.S. Cl. ................................. 125/13.01; 125/13.03; 83/372
(58) Field of Search .................................. 125/12, 13.01, 125/13.03; 83/471.2, 437.1, 372, 698.11, 886

(56) References Cited

U.S. PATENT DOCUMENTS

| | | | |
|---|---|---|---|
| 2,455,113 | * | 11/1948 | Coates . |
| 3,635,206 | * | 1/1972 | Harclerode . |
| 5,127,391 | * | 7/1992 | O'Keefe ............................ 125/13.01 |
| 6,000,387 | * | 12/1999 | Lee ................................... 125/13.01 |
| 6,080,041 | * | 6/2000 | Greenland .............................. 451/11 |

* cited by examiner

Primary Examiner—Timothy V. Eley
(74) Attorney, Agent, or Firm—Raymond Y. Chan; David and Raymond Patent Group

(57) ABSTRACT

A cutting saw machine has a motor arranged to be installed in a table frame which is used for supporting the cutting table and the coolant tray instead of mounted on the cutting head, so that the cutting head thereof can be made of light material to reduce the overall weight of the machine. Moreover, the motor is positioned below the coolant tray that can prevent direct contact with the user, and that the coolant tray also provides a cool surrounding to the motor that can help the motor to reduce its heat when it is functioning.

33 Claims, 9 Drawing Sheets

CUTTING SAW MACHINE

FIELD OF THE PRESENT INVENTION

The present to invention relates to a ceramic and masonry saw, and more particularly to a cutting saw machine having its motor installed in the cutting table instead of mounting on the cutting head so as to reduce the overall size and weight of the machine for easy operation, carry and storage.

BACKGROUND OF THE PRESENT INVENTION

Referring to FIG. 1, a conventional cutting saw machine as illustrated is commonly used in the construction industry for shaping and cutting masonry tiles and the like, made from materials such as granite, marble, slate, ceramics, paver, and brick. The traditional cutting saw machine 10 as shown in FIG. 1 includes a cutting table 11 supported on a floor standing frame 12, a cutting head 13 overhanging the cutting table 11 with a circular diamond saw blade 14 which is powered by an electric motor 15. The electric motor 15 is directly mounted on the cutting head 13 for driving the saw blade 14 to rotate through a transmission means 16.

Besides, liquid coolant that is circulated by pump is usually used to cool the saw blade 14 and work piece and to flush away sawdust. Although such conventional cutting saw machine substantially provides desirable features that include achieving precise and accurate cuts, ease of replacement of the blade when it is worn, rapid adjusting of the saw blade to various positions to permit complex cuts, ease of emptying the tray positioned underneath the saw blade, and etc., the conventional cutting saw still contains the following shortcomings.

1. The motor 15 is positioned above the cutting table 11 and the cutting head 13 supports the heavy weight of the motor 15. Therefore, the cutting head 13 must be made of strong material such as cast iron or steel alloy to rigidly support the heavy motor 15. The motor supporting cutting head 13 is heavy in weight that also increases the weight of the cutting saw machine.

2. The conventional cutting saw machine 10 as shown in FIG. 1 is more difficult to transport and operate due to the fact that the major portion of the weight of the whole cutting saw machine 10 is its upper part, including the motor 15, the cutting head 13, and the cutting table 11. In other words, the conventional cutting saw machine 10 has an unstable structure, i.e. a heavier upper head and a lighter lower support base, that may easily lose balance.

3. The user must be very carefully to prevent any body contact with the hot motor 15 exposed above the cutting table 11 to avoid unwanted body injury when the motor 15 is functioning during operation of the cutting saw machine.

SUMMARY OF THE PRESENT INVENTION

The main object of the present invention is to provide a cutting saw machine that has a motor installed in a table frame which is used for supporting the cutting table and the coolant tray, so that the cutting head thereof can be made of light material to reduce the overall weight of the machine.

Another object of the present invention is to provide a cutting saw machine that has a more stable structure that is more easily to transport and operate, because the major weight of the machine is distributed in the table frame where receives the motor and the coolant tray.

Another object of the present invention is to provide a cutting saw machine wherein the motor is positioned below the coolant tray that can prevent direct contact with the user, and that the coolant tray also provides a cool surrounding to the motor that can help the motor to reduce its heat when it is functioning.

Another object of the present invention is to provide a cutting saw machine, which contains an additional supporting, means to rotatably support the saw blade above the cutting table thereof.

Accordingly, in order to accomplish the foregoing objects, the present invention provides a cutting saw machine comprising:

a table frame;

a cutting table attached on the table frame;

a supporting frame, which is attached to the table frame, having a transmission chamber;

a cutting head having a proximal end and a distal end, wherein the cutting head is supported above of the cutting table by attaching the proximal end to the supporting frame;

a bearing housing assembly, which is disposed in the cutting head, having an output end and an input end which is extended to an upper position inside the transmission chamber of the supporting frame;

a circular saw blade positioned at the distal end of the cutting head and connected to the output end of the bearing housing assembly;

a motor mounted in the table frame having a driving shaft extended to a lower position inside the transmission chamber of the supporting frame;

a transmitting means disposed in the transmission chamber of the supporting frame for transmitting power outputting from the motor to the input end of the bearing housing assembly so as to drive the saw blade to rotate above the cutting table; and a coolant tray which is supported in the table frame and is disposed beneath the cutting table and above the motor.

Moreover, the coolant tray also forms a motor cavity indented thereunder for receiving the motor therein so as to reduce the size of the cutting saw machine and to provide cooling effect around the motor that also generates heat when functioning.

DETAILED DESCRIPTION OF THE PREFERRED EMBODIMENT

Figure 1:
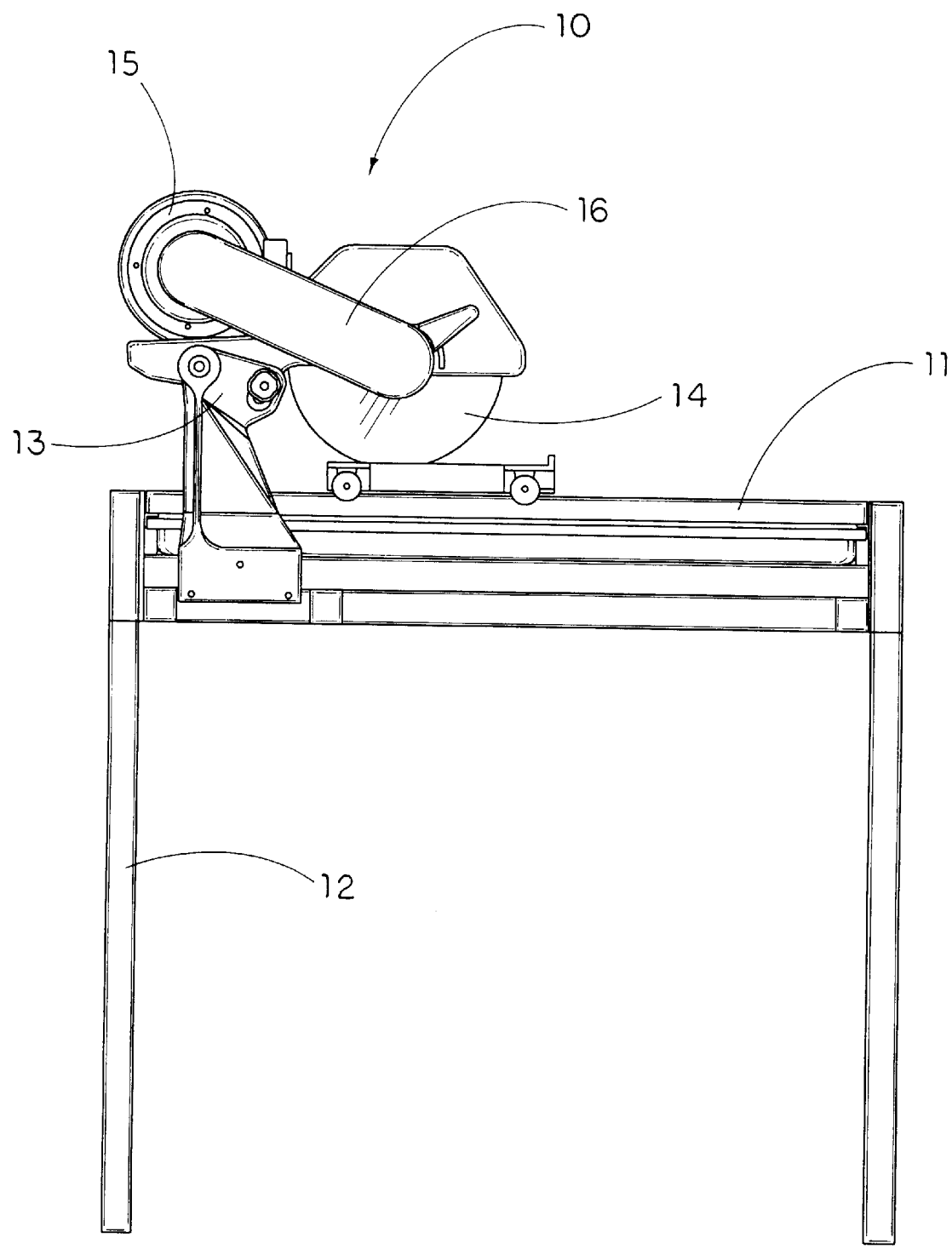
FIG. 1 is an elevation view of a conventional cutting saw machine.

Referring FIGS. 2 to 7 of the drawings, a cutting saw machine according to a preferred embodiment of the present invention is illustrated, which comprises a table frame 20, a cutting table 30, a supporting frame 40, a cutting head 50, a bearing housing assembly 60, a circular saw blade 6, a motor 70, a transmitting means 80, and a coolant tray 90.

Figure 2:
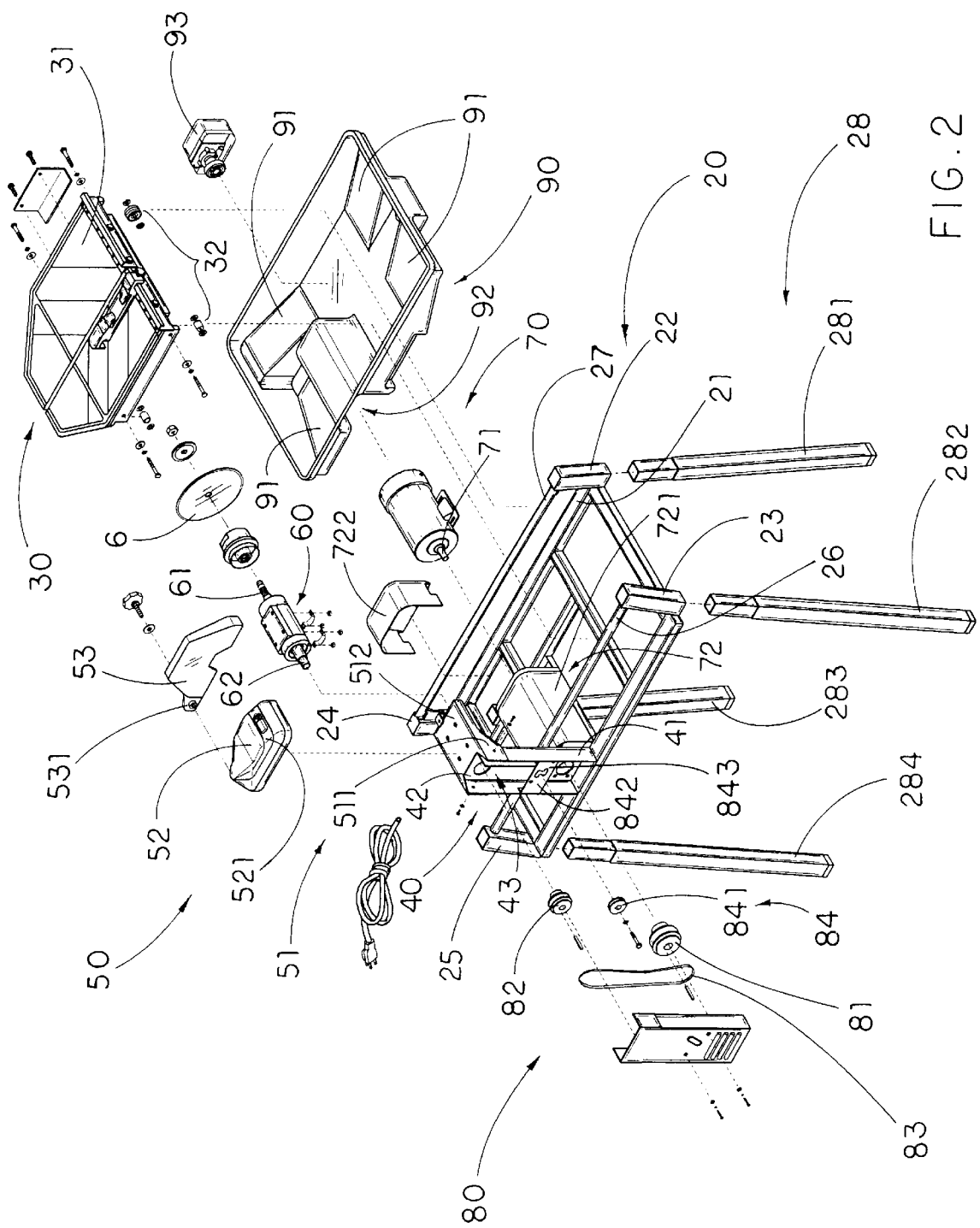
FIG. 2 is an exploded perspective view of a cutting saw machine with floor standing frame according to a preferred embodiment of the present invention.
Figure 3:
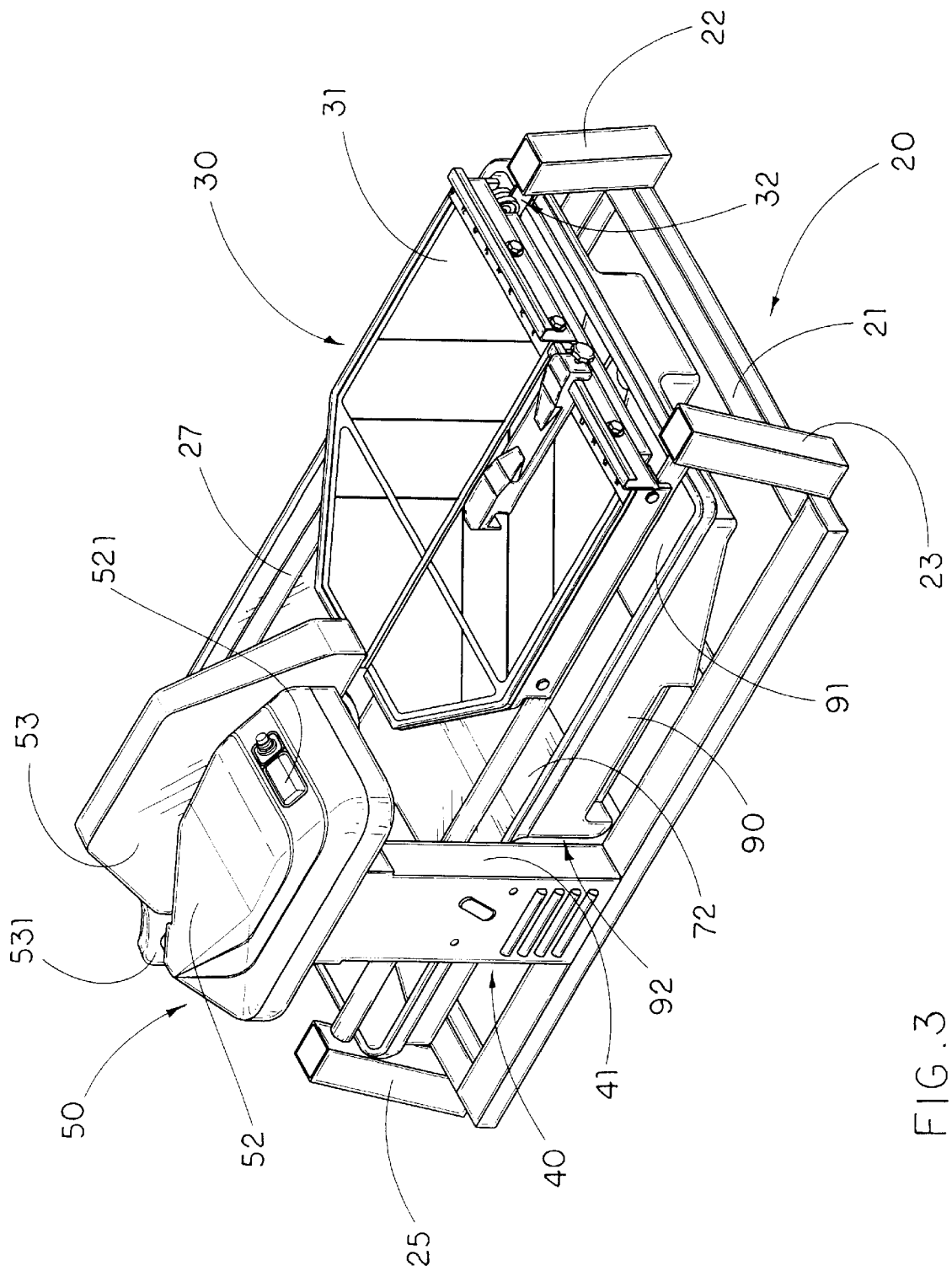
FIG. 3 is a perspective view of a cutting saw machine according to the above preferred embodiment of the present invention.
Figure 4:
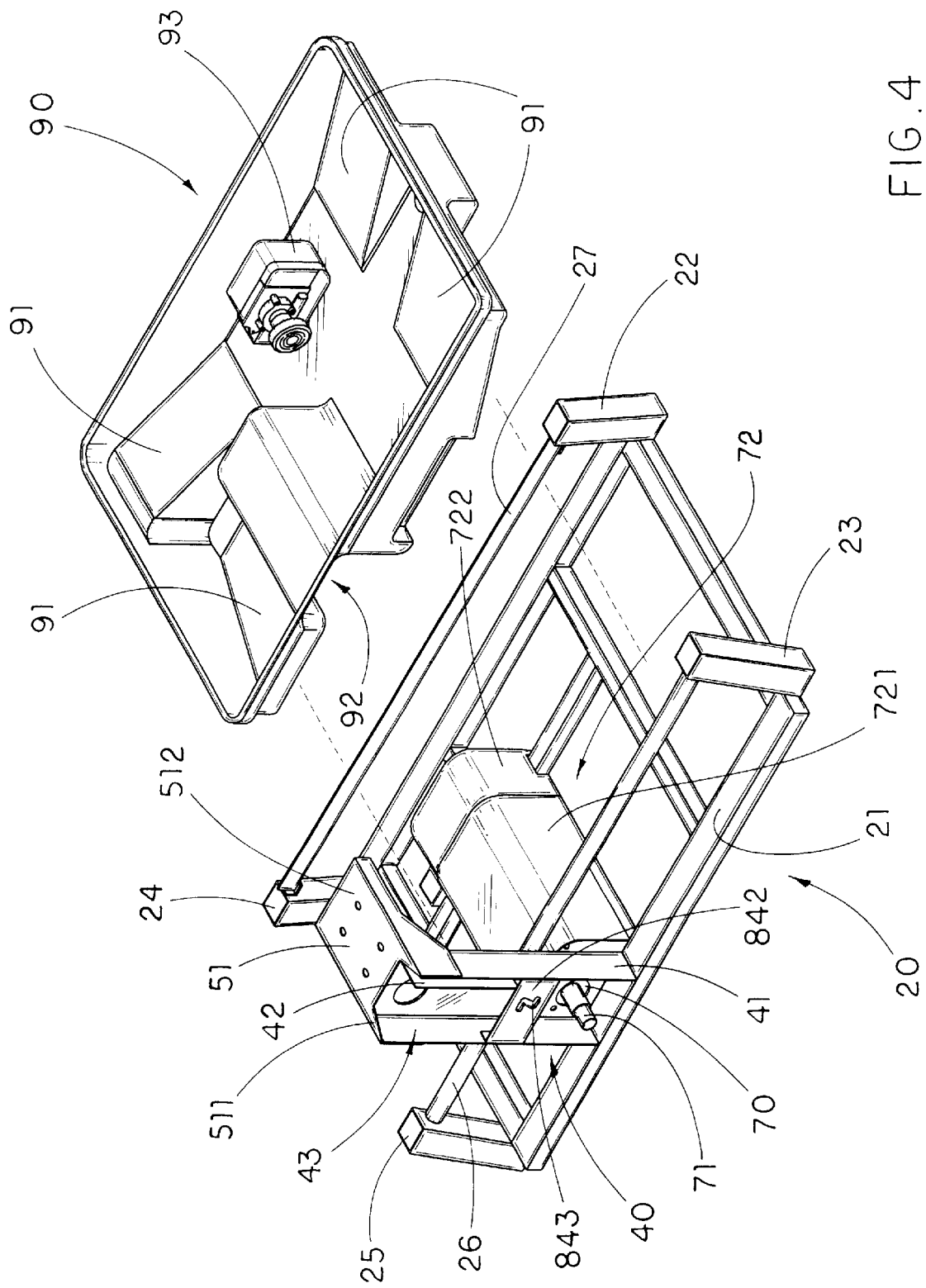
FIG. 4 is a perspective view of the table frame of the cutting saw machine according to the above preferred embodiment of the present invention.

As shown in FIGS. 2 to 4, the table frame 20 comprises a bottom frame 21, four construction posts 22, 23, 24, 25 upwardly extended from four corners of the bottom frame 21, a sliding rail 26 connected between two construction posts 23, 25 attached to a first side of the bottom frame 21, and a supporting rail 27 which is parallel to the sliding rail 26 and connected between another two construction posts 22, 24 attached to a second side of the bottom frame 21.

Figure 5:
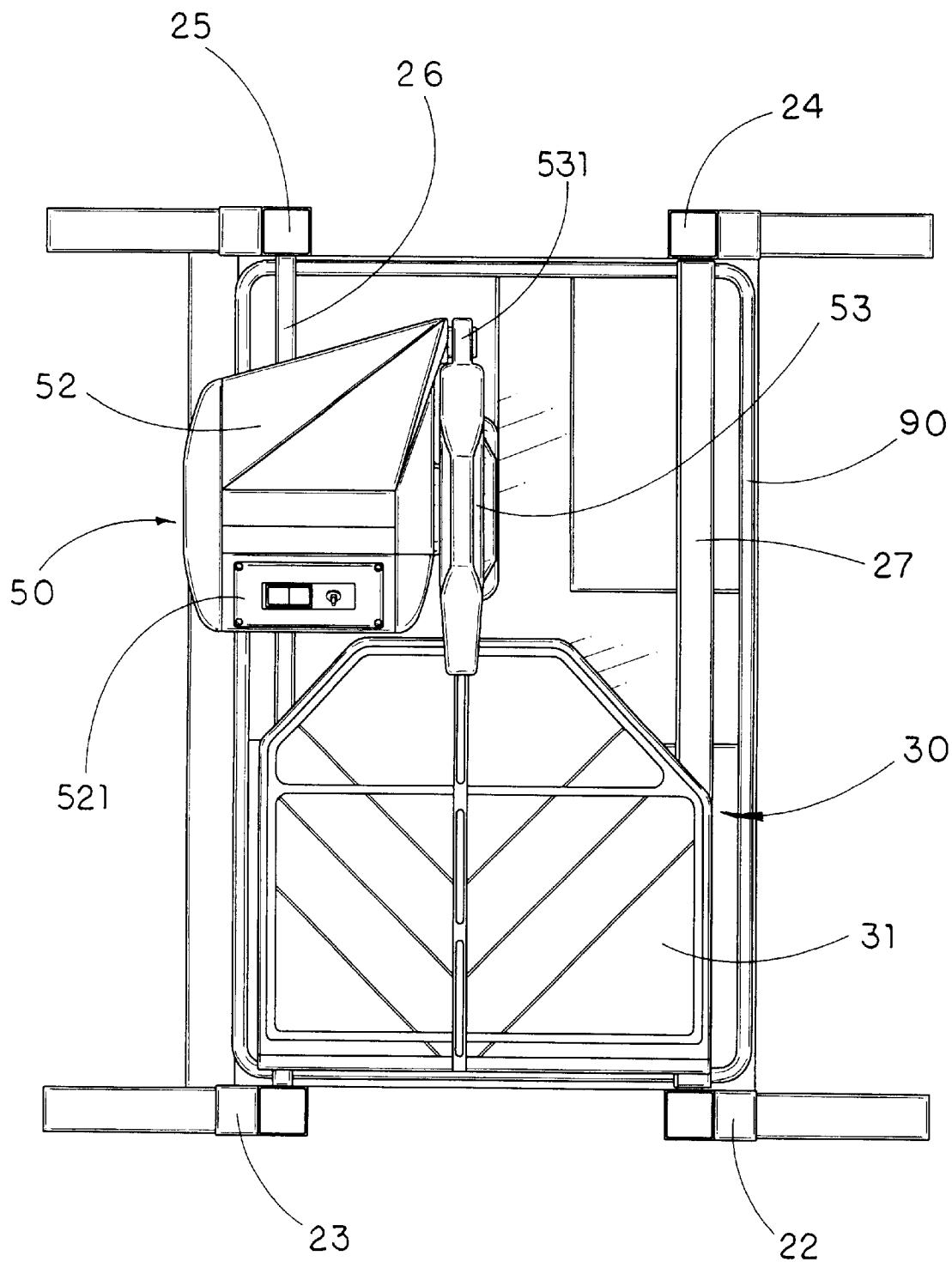
FIG. 5 is a top view of the cutting saw machine according to the above preferred embodiment of the present invention.

As shown in FIGS. 2, 3 and 5, the cutting table 30 is slidably mounted on the table frame 20. The cutting table 30 comprises a work table 31 sitting across the sliding rail 26 and the supporting rail 27 of the table frame 20, and a sliding arrangement 32 for enabling the work table 31 to slide along the sliding rail 26 and the supporting rail 27.

As shown in FIGS. 2, 3 and 4, the supporting frame 40, which is vertically attached to the table frame 20, has a bottom end 41 and a top end 42, wherein the bottom end 41 is firmly affixed to the first side of the bottom frame 21 of the table frame 20. A transmission chamber 43 is defined inside the supporting frame 40.

Figure 6:
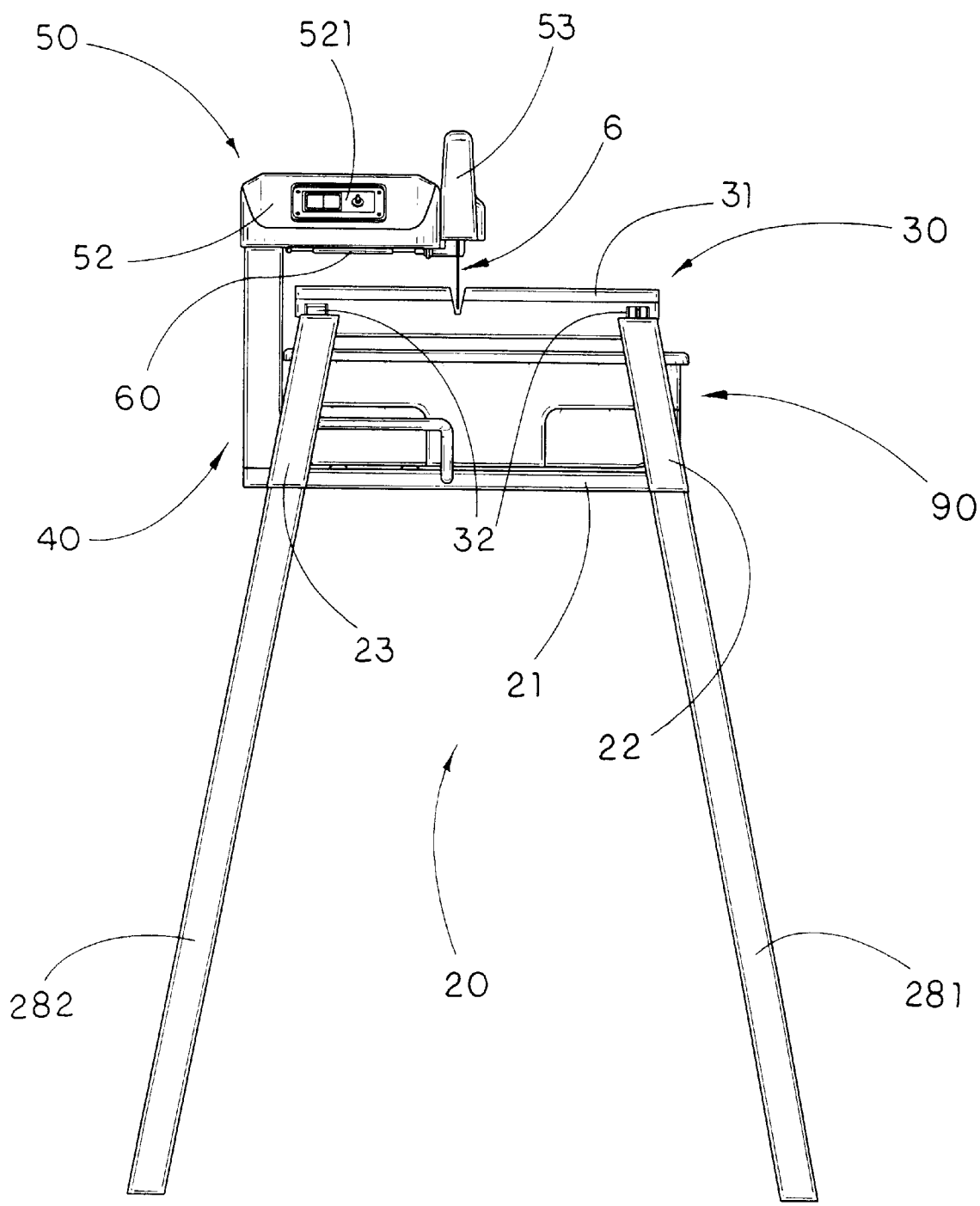
FIG. 6 is a side view of the cutting saw machine according to the above preferred embodiment of the present invention.

The cutting head 50 comprises a head frame 51 having a proximal end 511 and a distal end 512, wherein the cutting head 50 is horizontally supported above of the cutting table 30 by integrally affixed the proximal end 511 of the head frame 51 to the top end 42 of the supporting frame 40. As shown in FIGS. 2 and 6, below the head frame 51, the bearing housing assembly 60 is rigidly secured thereto. The bearing housing assembly 60 has an output end 61 and an input end 62 which is extended to an upper position inside the transmission chamber 43 of the supporting frame 40. As shown in FIGS. 2 and 6, the circular saw blade 6 which is positioned at the distal end 512 of the head frame 51 of the cutting head 50 is connected to the output end 61 of the bearing housing assembly 60.

As shown in FIGS. 2, 3, 5, and 6, the cutting head 50 further comprises a controlling head 52 mounted on the head frame 51 for covering the head frame 51 and the bearing housing assembly 60 secured thereunder. Other electrical controlling means 521 such as circuit control, fuse and controlling switch are installed therein for controlling the operation of the machine. A blade protective shell 53, which is in semi-circular shape, has a connecting end 531 pivotally connected to a rear end of the controlling head 52 for normally covering a top portion of the saw blade 6. The blade protective shell 53 can be upwardly rotated with respect to the connecting end 531 for replacing the saw blade 6 when it is worn out.

As shown in FIGS. 2 and 4, the motor 70 is firmly mounted on the bottom frame 21 of the table frame 20, wherein the motor 70 is aligned in parallel with the cutting head 50 so as to extend a driving shaft 71 of the motor 70 into a lower position of the transmission chamber 43 of the supporting frame 40, as shown in FIG. 4, according to the preferred embodiment of the present invention. In order to protect the motor 70, a motor protective housing 72 is used for covering the motor 70, wherein the motor protective housing 72 comprises a motor shell 721 attached to the bottom frame 21 to cover the motor 70 and an end cover 722 attached to a distal end of the motor shell 721.

In view of the foregoing disclosure, the input end 62 of the bearing housing assembly 60 and the driving shaft 71 of the motor 70 are respectively extended to the upper and lower positions inside the transmission chamber 43. As shown in FIG. 2, the transmitting means 80 is disposed in the transmission chamber 43 of the supporting frame 40 for transmitting power outputting from the motor 70 to the input end 62 of the bearing housing assembly 60 so as to drive the saw blade 6 to rotate above the cutting table 30.

As shown in FIG. 2, the transmission means 80 comprises a first transmitting wheel 81 and a second transmitting wheel 82 rotatably connected to the driving shaft 71 of the motor 70 and the input end 62 of the bearing housing assembly 60 inside the transmission chamber 43, and an endless transmitting member 83 disposed inside the transmission chamber 43 for connecting the first transmitting wheel 81 with the second transmitting wheel 82. According to the preferred embodiment as shown in FIG. 2, the transmitting member 83 is a transmitting belt and the first and second transmitting wheels 81, 82 are two belt pulleys.

As shown in FIGS. 2 and 4, the transmission means 80 further comprises a belt tension adjusting unit 84, which is installed inside the transmission chamber 43 of the supporting frame 40, for maintaining the transmitting tension of the belt-type transmitting member 83. The belt tension adjusting unit 84 comprises a pressure pulley 841, which is supported in the transmission chamber 43 to press against the belt-type transmitting member 83. The belt tension adjusting unit 84 further comprises a supporting bridge 842 extended across the transmission chamber 43, wherein an inclined Z-shaped hole 843 is provided on the supporting bridge 842, so that the user may adjust the pressure applied to the transmitting member 83 by locking the pressure pulley 841 at different positions of the Z-shaped hole 843 so as to adjust the transmitting tension of the transmitting member 83.

It should be understood that two chain gears can substitute the two belt pulleys when a transmitting chain is used as the transmitting member 83. In other words, the transmitting member 83 is adapted for connecting the driving shaft 71 of the motor 70 with input end 62 of the bearing housing assembly 60 so that the motor can drive the saw blade 6 to rotate through the power transmission of the driving shaft 71, the transmission means 80 and the bearing housing assembly 60.

The coolant tray 90 is supported in the table frame 20 and disposed beneath the cutting table 30 and above the motor 70. As shown in FIGS. 2 to 7, the coolant tray 90 has a size equal to or slightly smaller than the bottom frame 21 and a depth slightly smaller than the distance between the bottom frame 21 and the sliding rail 26 and the supporting rail 27. The coolant tray 90 is placed on the bottom frame 21 and guided by the sliding rail 26 and supporting rail 27, as shown in FIGS. 3 and 5. Inclined surfaces 91 are provided at two ends of the coolant tray 90 for facilitating coolant circulation. Moreover, a bottom side of the coolant tray 90 defines a motor cavity 92 which has a size fitting to receive the motor 70 therein when the coolant tray 90 is sat on the bottom frame 21, so that the top, front, rear, and right sides of the motor 70 are substantially surrounded by the coolant tray 90. In other words, the coolant tray 90 can also provide a cooling effect for the motor 70 located thereunder to dissipate the heat generated from the motor 70 when it is functioning.

Figure 7:
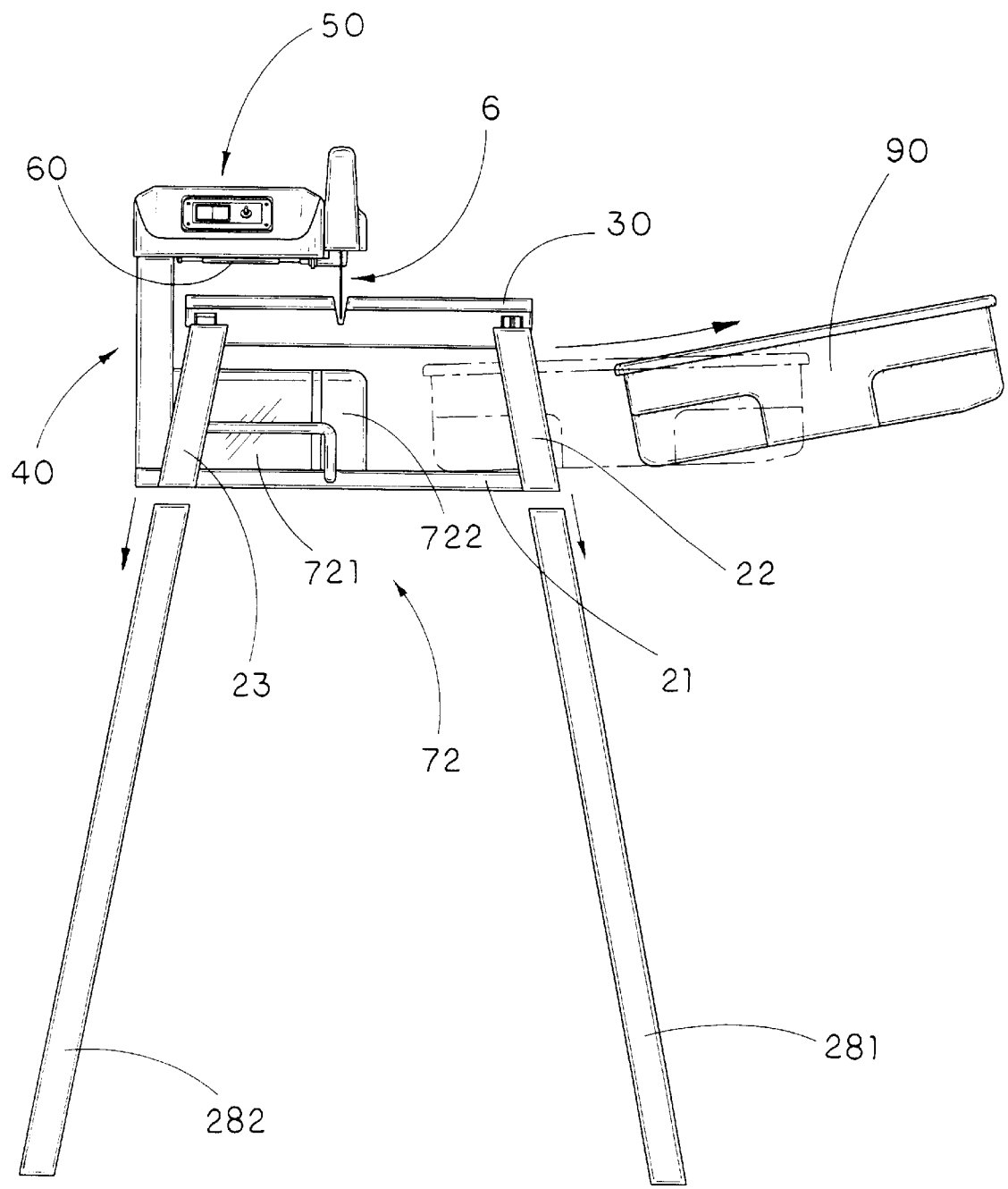
FIG. 7 is a side view of the cutting saw machine with the coolant tray pulling out according to the above preferred embodiment of the present invention.

As shown in FIG. 7, the coolant tray 90 can also be pulled out from the table frame 20 for cleaning or replacing the liquid coolant therein.

As shown in FIGS. 2 and 4, liquid coolant is filled in the coolant tray 90 and is circulated by a fluid pump 93 that is disposed in the cooling tray 90 to cool the cutting saw 6 and work piece and to flush away saw dust.

The cutting saw machine of the present invention as shown in FIG. 3 can be simply placed on a worktable of the user. However, as shown in FIG. 2, the cutting saw machine of the present invention may further comprises a floor standing frame 28 which includes four standing legs 281, 282, 283, 284 respectively connected with the four construction posts 22, 23, 24, 25 for supporting the machine on floor. During transpiration or storage, the user may detach the four standing legs 281 to 284 by pulling them out from four construction posts 22 to 25 to save space.

Figure 8:
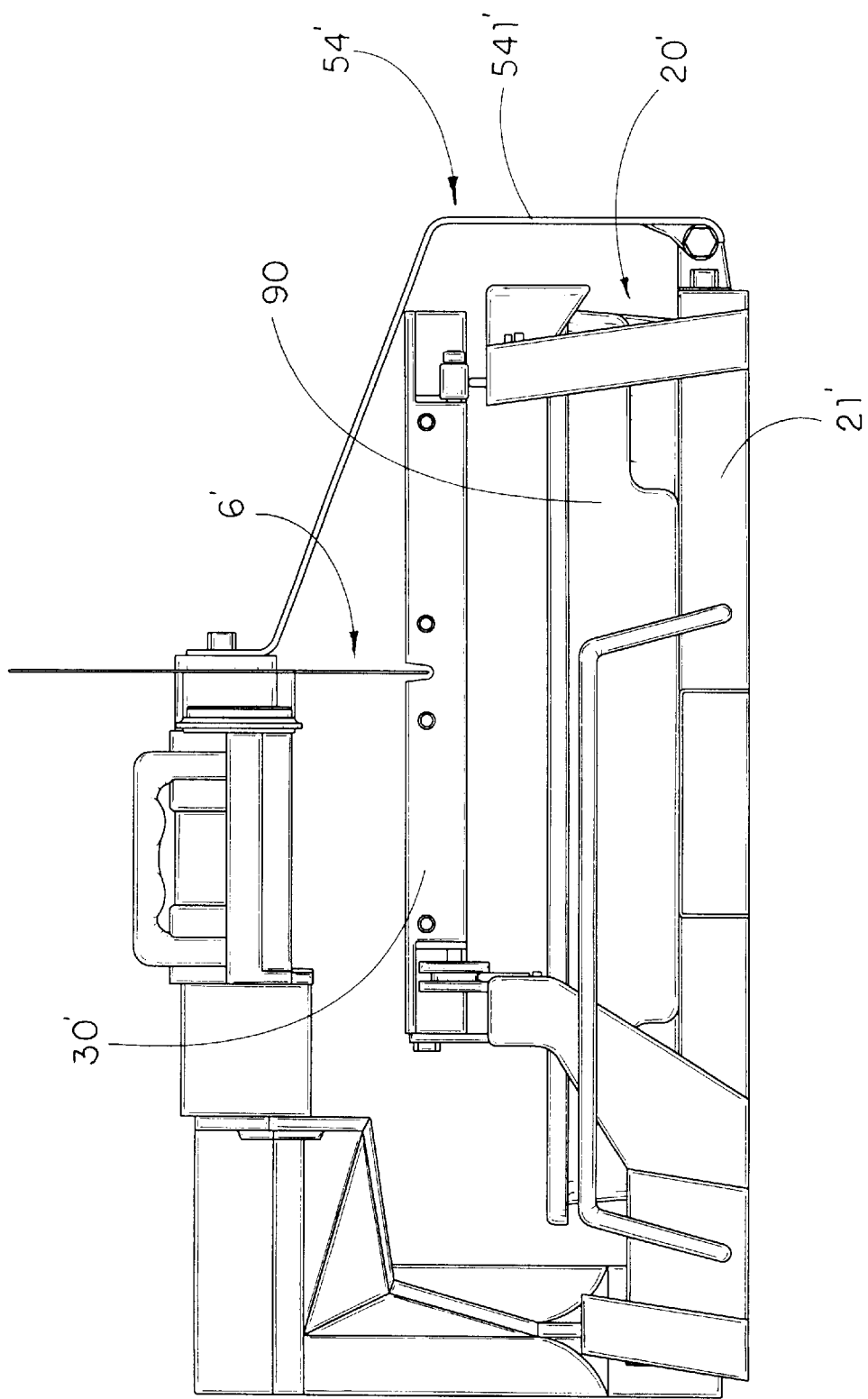
FIG. 8 is a side view of a first alternative mode of the cutting saw machine according to the above preferred embodiment of the present invention.
Figure 9:
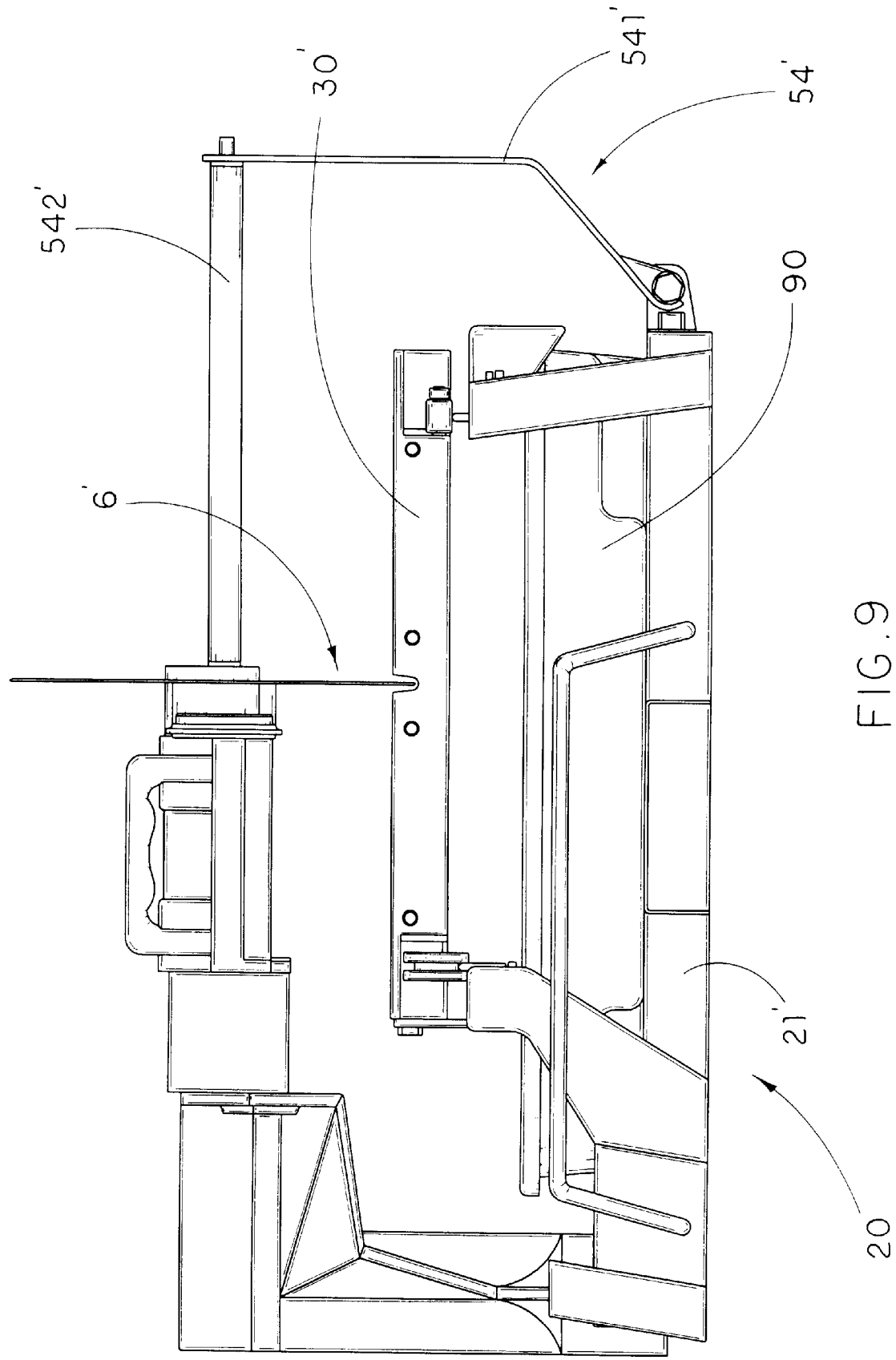
FIG. 9 is side view of a second alternative mode of the cutting saw machine according to the above preferred embodiment of the present invention.

Referring to FIG. 8, a first alternative mode of the preferred embodiment is illustrated, wherein an additional saw blade supporting means 54' is used to reinforce the supporting of the saw blade 6'. The additional saw blade supporting means 54's comprises a L-shaped supporting arm 541' having a top end supporting saw blade 6' and a bottom end pivotally connected to the second side of the bottom frame 21 of the table frame 20. As shown in FIG. 9. when a larger tile needs to be cut, the additional saw blade supporting means 54' further comprises a supporting bar 542 supported and extended between the saw blade 6' and the top end of the supporting arm 541.

According to the above disclosure, the following advantages can be concluded over prior arts.

First, the overlapping of the coolant tray 90 with the motor 70 can reduce the size of the cutting saw machine for easy storage and transportation. Practically, the cutting saw machine of the present invention, with the four standing legs detached, can even be fitted into a car trunk.

Second, due to the fact that the bottom frame 21 of the table frame 20 must has a strong construction for supporting the coolant tray 90 and the liquid coolant therein, therefore the motor 70 can be well supported by affixing on the bottom frame 21. In other words, according to the present invention, the supporting frame 40 and the head frame 51 of the cutting head 50 only need to support the bearing housing assembly 60 and the saw blade 6 but do not need to support the heavy motor anymore. Therefore, both the supporting frame 40 and the cutting head 50 can be constructed by light material that can largely reduce the weight of the cutting saw machine. In fact, for the same cutting power, a conventional cutting saw machine as shown in FIG. 1 normally weight 100 to 110 lbs. but the present invention as shown in FIG. 3 has a weight of 50 to 60 lbs. only.

Third, since the motor is placed under the coolant tray 90, so that the coolant tray 90 can collect any coolant spilling or dropping down, so that the drawback of the conventional cutting saw machine that the liquid coolant that may spill on the motor affixed on top of the cutting head can thus be avoided.

Fourth, an unexpected cooling effect for the motor 70 is achieved in the present invention. The liquid coolant in the coolant tray 90 is used for heat dissipation and the motor will generate heat during function. For the conventional machine, the coolant does nothing to the hot motor. However, according to the present invention, the motor 70 is surrounded by the coolant tray 90 wherein the liquid coolant in the coolant tray 90 may help dissipating the heat generated from the motor, so as to prolong the service life span of the motor.

Fifth, the cutting saw machine of the present invention is more easily to assemble since it is easier to affix the heavy motor 70 on the large bottom frame 21 than to mount on the small cutting head. The manufacturing cost of the present invention is also lower by eliminating the strong, heavy and expensive construction of the cutting head framework.

Sixth, the risk of the user being burnt by the heat of the motor of the prior art is eliminated because the motor 70 of the present invention is stored under the coolant tray 90.

What is claimed is:

1. A cutting saw machine, comprising:

a table frame;

a cutting table attached on said table frame;

a supporting frame, which is attached to said table frame, having a transmission chamber;

a cutting head having a proximal end and a distal end, wherein said cutting head is supported above of said cutting table by attaching said proximal end to said supporting frame;

a bearing housing assembly, which is supported by said cutting head, having an output end and an input end extended to an upper position inside said transmission chamber of said supporting frame;

a saw blade which is positioned at said distal end of said cutting head and connected to said output end of said bearing housing assembly;

a motor, which is mounted in said table frame, having a driving shaft extended to a lower position in said transmission chamber of said supporting frame;

a transmitting means disposed in said transmission chamber of said supporting frame for transmitting power outputting from said motor to said input end of said bearing housing assembly so as to drive said saw blade to rotate above said cutting table; and a coolant tray which is supported in said table frame and is disposed beneath said cutting table and above said motor.

2. A cutting saw machine, as recited in claim 1, wherein a bottom side of said coolant tray defines a motor cavity adapted for receiving said motor when said coolant tray is placed in said table frame, wherein at least one of said motor is surrounded by said coolant tray.

3. A cutting saw machine, as recited in claim 2, wherein said table frame comprises a bottom frame, four construction posts upwardly extended from four corners of said bottom frame, a sliding rail connected between two construction posts attached to a first side of said bottom frame, and a supporting rail which is parallel to said sliding rail and connected between another two construction posts attached to a second side of said bottom frame, wherein said motor is firmly affixed on said bottom frame, said coolant tray is sat on said bottom frame and said cutting table is slidably mounted between said sliding rail and said supporting rail.

4. A cutting saw machine, as recited in claim 3, wherein said supporting frame is vertically attached to said table frame and has a bottom end and a top end, wherein said bottom end is firmly affixed to said first side of said bottom frame of said table frame, wherein said cutting head comprises a head frame having a proximal end and a distal end, wherein said cutting head is horizontally supported above of said cutting table by integrally affixing said proximal end of said head frame to said top end of said supporting frame, moreover below said head frame, said bearing housing assembly is rigidly secured thereto and said circular saw blade which is positioned at said distal end of said head frame of said cutting head is connected to said output end of said bearing housing assembly.

5. A cutting saw machine, as recited in claim 4, further comprising a blade protective shell, which has a connecting end pivotally connected to a rear end of said cutting head for normally covering a top portion of said saw blade, wherein said blade protective shell is capable of upwardly rotating with respect to said connecting end.

6. A cutting saw machine, as recited in claim 4, further comprising a motor protective housing for covering said motor.

7. A cutting saw machine, as recited in claim 3, further comprising a floor standing frame which includes four standing legs respectively connected with said four construction posts.

8. A cutting saw machine, as recited in claim 2, wherein said supporting frame is vertically attached to said table frame and said cutting head comprises a head frame having a proximal end and a distal end, wherein said cutting head is horizontally supported above of said cutting table by integrally affixing said proximal end of said head frame to said supporting frame.

9. A cutting saw machine, as recited in claim 8, wherein said bearing housing assembly is rigidly secured to said head frame and said saw blade is positioned at said distal end of said head frame and connected to said output end of said bearing housing assembly.

10. A cutting saw machine, as recited in claim 9, further comprising a blade protective shell, which has a connecting end pivotally connected to a rear end of said cutting head for normally covering a top portion of said saw blade, wherein said blade protective shell is capable of upwardly rotating with respect to said connecting end.

11. A cutting saw machine, as recited in claim 10, wherein said transmitting means comprises a first transmitting wheel and a second transmitting wheel rotatably connected to said driving shaft of said motor and said input end of said bearing housing assembly inside said transmission chamber, and an endless transmitting member disposed inside said transmission chamber for connecting said first transmitting wheel with said second transmitting wheel.

12. A cutting saw machine, as recited in claim 11, wherein said transmitting member is a transmitting belt and said first and second transmitting wheels are two belt pulleys.

13. A cutting saw machine, as recited in claim 12, wherein said transmission means further comprises a belt tension adjusting unit, which is installed inside said transmission chamber of said supporting frame, for maintaining said transmitting tension of said transmitting member, wherein said belt tension adjusting unit comprises a pressure pulley which is supported in said transmission chamber to press against said transmitting member, wherein said belt tension adjusting unit further comprises a supporting bridge extended across said transmission chamber, wherein an inclined Z-shaped hole is provided on said supporting bridge, wherein a pressure applied to said transmitting member is able to be adjusted by locking said pressure pulley at different positions of said Z-shaped hole so as to adjust said transmitting tension of said transmitting member.

14. A cutting saw machine, as recited in claim 13, further comprising an additional saw blade supporting means for reinforcing and supporting said saw blade, wherein said additional saw blade supporting means comprises a L-shaped supporting arm having a top end supporting said saw blade and a bottom end pivotally connected to said table frame.

15. A cutting saw machine, as recited in claim 13, further comprising an additional saw blade supporting means for reinforcing and supporting said saw blade, wherein said additional saw blade supporting means comprises a L-shaped supporting arm having a top end and a bottom end pivotally connected to said table frame, and a supporting bar supported and extended between said saw blade and said top end of said supporting arm.

16. A cutting saw machine, as recited in claim 9, further comprising a motor protective housing for covering said motor.

17. A cutting saw machine, as recited in claim 2, wherein said transmitting means comprises a first transmitting wheel and a second transmitting wheel rotatably connected to said driving shaft of said motor and said input end of said bearing housing assembly inside said transmission chamber, and an endless transmitting member disposed inside said transmission chamber for connecting said first transmitting wheel with said second transmitting wheel.

18. A cutting saw machine, as recited in claim 17, wherein said transmitting member is a transmitting belt and said first and second transmitting wheels are two belt pulleys.

19. A cutting saw machine, as recited in claim 18, wherein said transmission means further comprises a belt tension adjusting unit, which is installed inside said transmission chamber of said supporting frame, for maintaining said transmitting tension of said transmitting member.

20. A cutting saw machine, as recited in claim 19, wherein said belt tension adjusting unit comprises a pressure pulley which is supported in said transmission chamber to press against said transmitting member.

21. A cutting saw machine, as recited in claim 20, wherein said belt tension adjusting unit further comprises a supporting bridge extended across said transmission chamber, wherein an inclined Z-shaped hole is provided on said supporting bridge, wherein a pressure applied to said transmitting member is able to be adjusted by locking said pressure pulley at different positions of said Z-shaped hole so as to adjust said transmitting tension of said transmitting member.

22. A cutting saw machine, as recited in claim 2, further comprising an additional saw blade supporting means for reinforcing and supporting said saw blade, wherein said additional saw blade supporting means comprises a L-shaped supporting arm having a top end supporting said saw blade and a bottom end pivotally connected to said table frame.

23. A cutting saw machine, as recited in claim 2, further comprising an additional saw blade supporting means for reinforcing and supporting said saw blade, wherein said additional saw blade supporting means comprises a L-shaped supporting arm having a top end and a bottom end pivotally connected to said table frame, and a supporting bar supported and extended between said saw blade and said top end of said supporting arm.

24. A cutting saw machine, as recited in claim 1, wherein said supporting frame is vertically attached to said table frame and said cutting head comprises a head frame having a proximal end and a distal end, wherein said cutting head is horizontally supported above of said cutting table by integrally affixing said proximal end of said head frame to said supporting frame.

25. A cutting saw machine, as recited in claim 24, wherein said bearing housing assembly is rigidly secured to said head frame and said saw blade is positioned at said distal end of said head frame and connected to said output end of said bearing housing assembly.

26. A cutting saw machine, as recited in claim 1, further comprising a motor protective housing for covering said motor.

27. A cutting saw machine, as recited in claim 1, wherein said transmitting means comprises a first transmitting wheel and a second transmitting wheel rotatably connected to said driving shaft of said motor and said input end of said bearing housing assembly inside said transmission chamber, and an endless transmitting member disposed inside said transmission chamber for connecting said first transmitting wheel with said second transmitting wheel.

28. A cutting saw machine, as recited in claim 27, wherein said transmitting member is a transmitting belt and said first and second transmitting wheels are two belt pulleys.

29. A cutting saw machine, as recited in claim 28, wherein said transmission means further comprises a belt tension adjusting unit, which is installed inside said transmission chamber of said supporting frame, for maintaining said transmitting tension of said transmitting member.

30. A cutting saw machine, as recited in claim 29, wherein said belt tension adjusting unit comprises a pressure pulley which is supported in said transmission chamber to press against said transmitting member.

31. A cutting saw machine, as recited in claim 30, wherein said belt tension adjusting unit further comprises a supporting bridge extended across said transmission chamber, wherein an inclined Z-shaped hole is provided on said supporting bridge, wherein a pressure applied to said transmitting member is able to be adjusted by locking said pressure pulley at different positions of said Z-shaped hole so as to adjust said transmitting tension of said transmitting member.

32. A cutting saw machine, as recited in claim 1, further comprising an additional saw blade supporting means for reinforcing and supporting said saw blade, wherein said additional saw blade supporting means comprises a L-shaped supporting arm having a top end supporting said saw blade and a bottom end pivotally connected to said table frame.

33. A cutting saw machine, as recited in claim 1, further comprising an additional saw blade supporting means for reinforcing and supporting said saw blade, wherein said additional saw blade supporting means comprises a L-shaped supporting arm having a top end and a bottom end pivotally connected to said table frame, and a supporting bar supported and extended between said saw blade and said top end of said supporting arm.

* * * * *